Sept. 24, 1946.  E. E. ERIKSSON  2,408,302

RECORDING DEVICE FOR AUTOMOBILES

Filed Aug. 1, 1945

INVENTOR.
Erik E. Eriksson.
BY
Maxwell V. Wallace
ATTORNEY.

Patented Sept. 24, 1946

2,408,302

UNITED STATES PATENT OFFICE 2,408,302

RECORDING DEVICE FOR AUTOMOBILES

Erik E. Eriksson, Base Line, Mich.

Application August 1, 1945, Serial No. 608,123

3 Claims. (Cl. 40—68)

This invention relates to a recording device, and more particularly to a recording device of the type for use with an automobile where the owner is desirous of determining the number of miles traveled between oiling and greasing periods.

An object of the present invention is to provide a new and improved device which in turn provides a separate recording of an odometer and maintaining such a record reading for subsequent comparison with the total mileage reading of the odometer. It is the custom today to have an automobile greased and the oil changed after each one thousand miles of travel. The recorder is set to correspond with whatever the total mileage reading of the odometer may be at the time. Thereafter, as the odometer registers additional mileage, a comparison may always be had, so that difference between the readings at any given moment will show the miles traveled since setting the recording device, and when this difference is shown to be, in this instance, one thousand miles, the owner knows that it is again time to change the oil and have the car greased.

A still further object of the invention is to so place the recording device so that it is at all times adjacent the odometer and to provide a locking means for said recording device to lock the same in a set position to prevent change of the setting.

The above and other objects will appear more fully from the following more detailed description, and from the drawing wherein.

Figure 1:
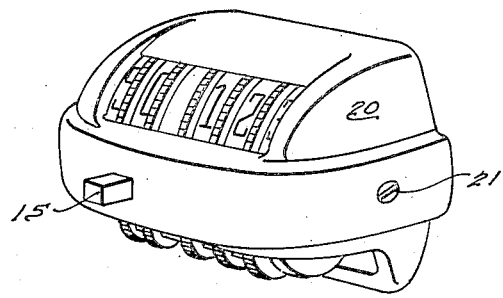
Fig. 1 is a perspective view of the recording device as it appears on the instrument panel of an automobile.
Figure 2:
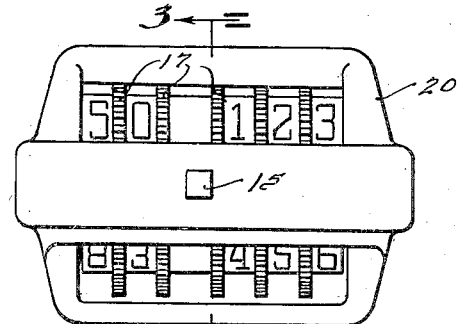
Fig. 2 is a front elevational view of the device as the same appears to the driver of a car showing the recording.

Referring now to the drawing, the numeral 10 designates a U-shaped bracket which may be conveniently secured to the instrument panel of an automobile by means of bolts 11. A shaft 12 is suitably and non-rotatably mounted in bracket 10, the same containing a recessed longitudinal slot or recess 13, sufficient in depth to receive a locking bar member 14, said member being substantially T-shaped, the stem of the T 15, acting as a plunger for the purpose of bringing pressure to bear upon a leaf spring 16 which is interposed between locking member 14 and the bottom of recess 13 for a purpose later to be described. Directly opposed to recess 13 is an additional shallow recess 25 adapted to receive a ratchet bar 26 containing five projections 27, the use for which will appear more clearly in this description.

Rotatably mounted upon shaft 12 are five wheels 17, each wheel having a portion of its outer periphery knurled 18, so that it may be easily rotated. The wheels are constructed sufficiently wide to receive indicia, each wheel containin ten numerals peripherally arranged thereon. Each wheel has a central opening therethrough of sufficient diameter to allow the wheel to slide upon shaft 12 and each central opening has formed on the periphery thereof ten notches 19 each notch being radially aligned with a numeral appearing on the outer periphery of the wheel 17 per se. The five wheels 17 are at all times held against rotation by means of a ratchet bar 26 which seats within slot 25, said bar having formed therein five projections 27 which are in longitudinal alignment and adapted to engage aligned notches 19 formed in central opening of wheels 17 and prevent the wheels from rotating freely on shaft 12.

Figure 3:
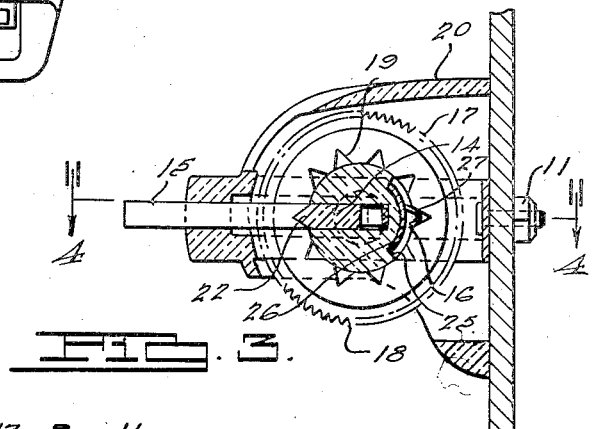
Fig. 3 is a vertical section of the device taken substantially on the line 3—3 of Fig. 2.
Figure 4:
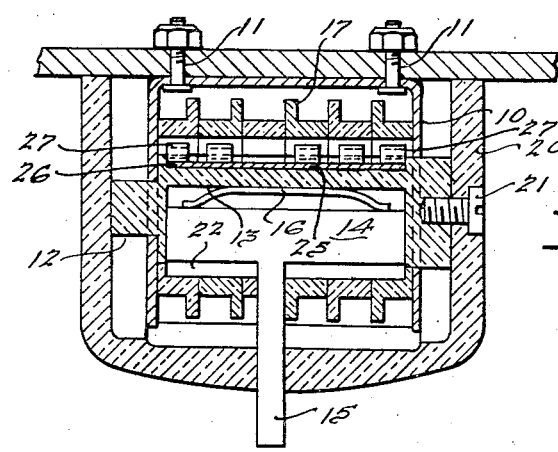
Fig. 4 is a section taken substantially on the line 4—4 of Fig. 3.

A housing 20 is provided to enclose the working parts of the recording device, the same being secured to the recording mechanism by means of a set screw 21 which passes through an opening provided therefor in said housing into one end of shaft 12. There is also an opening in the front portion of housing 20 to allow plunger 15 to project therethrough. The entire working or leading edge of locking bar 14 is wedge-shaped 22, as shown best in Fig. 3 of the drawing, so that same may engage notches 19 when the device is in a locked position.

The method of using the device is as follows:

In its normal position the device remains in what might be termed its locked position where it has remained since the previous setting by the car owner. Following the thousand mile greasing and oiling period the user wishes to reset the recorder and does so by first releasing the recording wheels 17 by pressing plunger 15 inwardly, which pressure is imparted to locking bar 14 and leaf spring 16. As leaf spring 16 is flattened by said pressure, locking bar 14 passes into longitudinal recess 13 and becomes disengaged from notches 19 and while locking bar 14 is in this position wheels 17 may be rotated on shaft 12. Wheels 17 cannot be spun on shaft 12 because they are at all times held against free movement by means of ratchet bar 26 with five engaging projections 27 which projections at all times engage notches 19 which are in longitudinal alignment therewith, said engagement being through the notches opposed to those used to lock the device, the same being best illustrated in Fig. 3 of the drawing. The operator, to set the recorder, simply rotates each wheel by means of the knurled portion 18 thereon, contacting same through the lower opening in housing 20. Each wheel is rotated against ratchet movement of ratchet bar 26 so that a sequence of numbers remain in longitudinal alignment at all times until the correct reading has been transferred from the odometer to the recording device. Once pressure is off plunger 15, leaf spring 16 forces locking bar 14 outwardly from recess 13 and the wedge-shaped leading edge of said bar 14 engages the five aligned notches 19 opposite said bar in each of the five wheels, thereby locking the same against rotation.

Inasmuch as each notch is in radial alignment with each numeral on the outer periphery of each wheel, there being ten numerals and ten notches on each wheel, the numerals on the outer periphery must be in longitudinal alignment and the notches to receive the locking bar 14 must also be in longitudinal alignment so that said bar engages all five notches in alignment and the wheels are held against movement. The correct mileage reading may now be visible through the upper opening in housing 20 where it is in constant view of the car operator.

The odometer record changes with continued travel of the car, but a comparison of the changed reading with the recorder may be had at any time to show the number of miles traveled since the recorder was last set.

The device may be constructed of any well known material, but the device per se has been constructed of plastic which enables the manufacturer to duplicate the same in quantity at greatly reduced cost.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. A recording device of the class described comprising, in combination, a housing having therein a bracket, a slotted shaft non-rotatably mounted in said bracket, a plurality of wheels rotatably mounted on said shaft having central openings therein, indicia on the outer periphery of said wheels and a plurality of notches on the periphery of said central wheel openings, ratchet means seated in said shaft and permanently engaging said notches on the periphery of said central wheel openings, and a locking member seated within said slotted shaft, opposed to said ratchet means, adapted to engage said central opening notches and lock the wheels against rotation.

2. A recording device of the class described comprising, in combination, a housing having therein a bracket, a slotted shaft non-rotatably mounted in said bracket, a plurality of wheels rotatably mounted on said shaft having central openings therein, indicia on the outer periphery of said wheels and a plurality of notches on the periphery of said central wheel openings, locking means seated within said slotted shaft, said means comprising a spring pressed solid bar adapted to engage said notches in said wheel openings and lock the same against rotation, ratchet means located on the back of said shaft comprising a strip having formed thereon five projections, said projections being adapted to lightly contact said central notches and prevent free rotation of said wheels when said wheel locking bar has been disengaged from said notches.

3. A recording device of the class described comprising, in combination a housing having therein a bracket, a slotted shaft non-rotatably mounted in said bracket, a plurality of wheels rotatably mounted on said shaft having central openings therein, indicia on the outer periphery of said wheels and a plurality of notches radially aligned with said indicia on the periphery of said central wheel openings, locking means seated within the front portion of said slotted shaft comprising a spring pressed wedge-shaped bar adapted to engage said notches in said wheel openings and lock said wheels against rotation, and means seated within the rear portion of said slotted shaft comprising a ratchet bar having projections longitudinally aligned thereon adapted to lightly engage said notches and hold the same in longitudinal alignment and prevent free movement of same when said locking bar is disengaged.

ERIK E. ERIKSSON.